United States Patent
Ohnishi

(10) Patent No.: US 8,529,054 B2
(45) Date of Patent: Sep. 10, 2013

(54) INK, INKJET PRINTER, AND METHOD FOR PRINTING

(75) Inventor: Masaru Ohnishi, Tomi (JP)

(73) Assignee: Mimaki Engineering Co., Ltd., Tomi (JP)

( * ) Notice: Subject to any disclaimer, the term of this patent is extended or adjusted under 35 U.S.C. 154(b) by 0 days.

(21) Appl. No.: 13/309,565

(22) Filed: Dec. 2, 2011

(65) Prior Publication Data
US 2012/0075394 A1 Mar. 29, 2012

Related U.S. Application Data

(63) Continuation of application No. PCT/JP2010/002863, filed on Apr. 21, 2010.

(30) Foreign Application Priority Data

Jun. 4, 2009 (JP) ................. 2009-135558

(51) Int. Cl.
- *B41J 2/01* (2006.01)
- *B41J 2/135* (2006.01)
- *B41J 2/045* (2006.01)
- *B41J 2/105* (2006.01)

(52) U.S. Cl.
USPC .................. 347/102; 347/45; 347/70; 347/82

(58) Field of Classification Search
None
See application file for complete search history.

(56) References Cited

U.S. PATENT DOCUMENTS

| | | | |
|---|---|---|---|
| 7,490,930 B2 * | 2/2009 | Morohoshi et al. | 347/100 |
| 2005/0036019 A1 * | 2/2005 | Maekawa et al. | 347/100 |
| 2005/0151815 A1 | 7/2005 | Kanai et al. | |
| 2005/0173680 A1 | 8/2005 | Yang | |
| 2005/0270351 A1 * | 12/2005 | Mouri et al. | 347/103 |
| 2006/0021537 A1 * | 2/2006 | Ohtsu et al. | 101/487 |
| 2006/0055752 A1 | 3/2006 | Nakajima | |
| 2006/0098064 A1 | 5/2006 | Noutary | |
| 2006/0257632 A1 * | 11/2006 | Sugai | 428/195.1 |
| 2007/0270568 A1 | 11/2007 | Ushiki et al. | |
| 2008/0248260 A1 * | 10/2008 | Kojima et al. | 428/195.1 |
| 2009/0033730 A1 * | 2/2009 | Shino et al. | 347/102 |
| 2009/0092801 A1 | 4/2009 | Sato et al. | |

FOREIGN PATENT DOCUMENTS

| | | |
|---|---|---|
| JP | 07-170054 | 7/1995 |
| JP | 2002-137375 | 5/2002 |
| JP | 2002-241654 | 8/2002 |
| JP | 2004-018716 | 1/2004 |

(Continued)

OTHER PUBLICATIONS

International Search Report for International Application No. PCT/JP2010/002863, Jun. 10, 2010.

(Continued)

*Primary Examiner* — Stephen Meier
*Assistant Examiner* — Alexander C Witkowski
(74) *Attorney, Agent, or Firm* — Ditthavong Mori & Steiner, P.C.

(57) ABSTRACT

An ink includes a volatile organic solvent and a UV curable ink. The ink has a viscosity greater than or equal to 3 mPa·sec and less than or equal to 18 mPa·sec (at 25° C.). The UV curable ink has a viscosity of greater than or equal to 20 mPa·sec (at 25° C.). The UV curable ink comprises a pigment, an ultraviolet curable resin curable by an ultraviolet light, and a photopolymerization initiator.

18 Claims, 2 Drawing Sheets

(56) References Cited

FOREIGN PATENT DOCUMENTS

| | | |
|---|---|---|
| JP | 2005-045116 | 2/2005 |
| JP | 2005-229109 | 8/2005 |
| JP | 2005-298757 | 10/2005 |
| JP | 2005-532445 | 10/2005 |
| JP | 2007-310315 | 11/2007 |
| JP | 2008-155524 | 7/2008 |
| JP | 2008-194827 | 8/2008 |
| JP | 2009-083272 | 4/2009 |
| WO | WO 01/57145 A1 | 8/2001 |
| WO | WO 2004/056579 | 7/2004 |
| WO | WO 2004/094150 | 11/2004 |
| WO | WO 2006/075654 | 7/2006 |
| WO | WO 2007/125917 | 11/2007 |

OTHER PUBLICATIONS

Japanese Office Action for corresponding JP Application No. 2009-135558, Mar. 23, 2011.
Japanese Office Action for corresponding JP Application No. 2009-135558, Jun. 22, 2011.
Japanese Office Action for corresponding JP Application No. 2011-289116, Dec. 5, 2012.
Japanese Office Action for corresponding JP Application No. 2011-289116, Feb. 20, 2013.

* cited by examiner

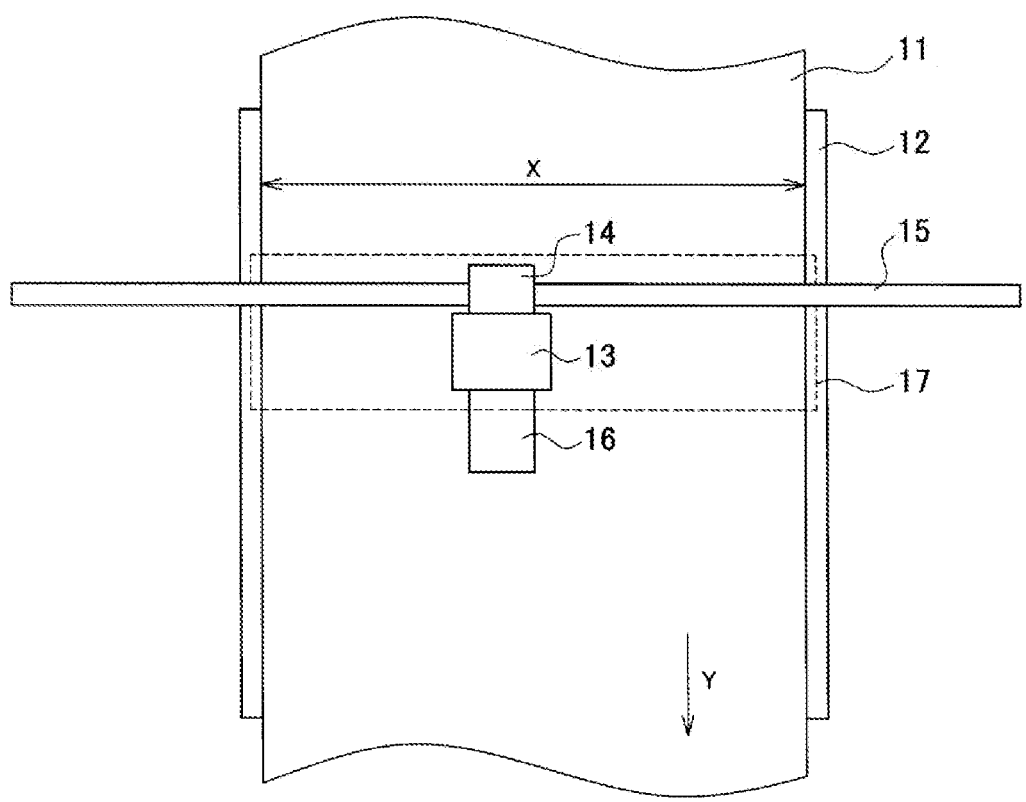

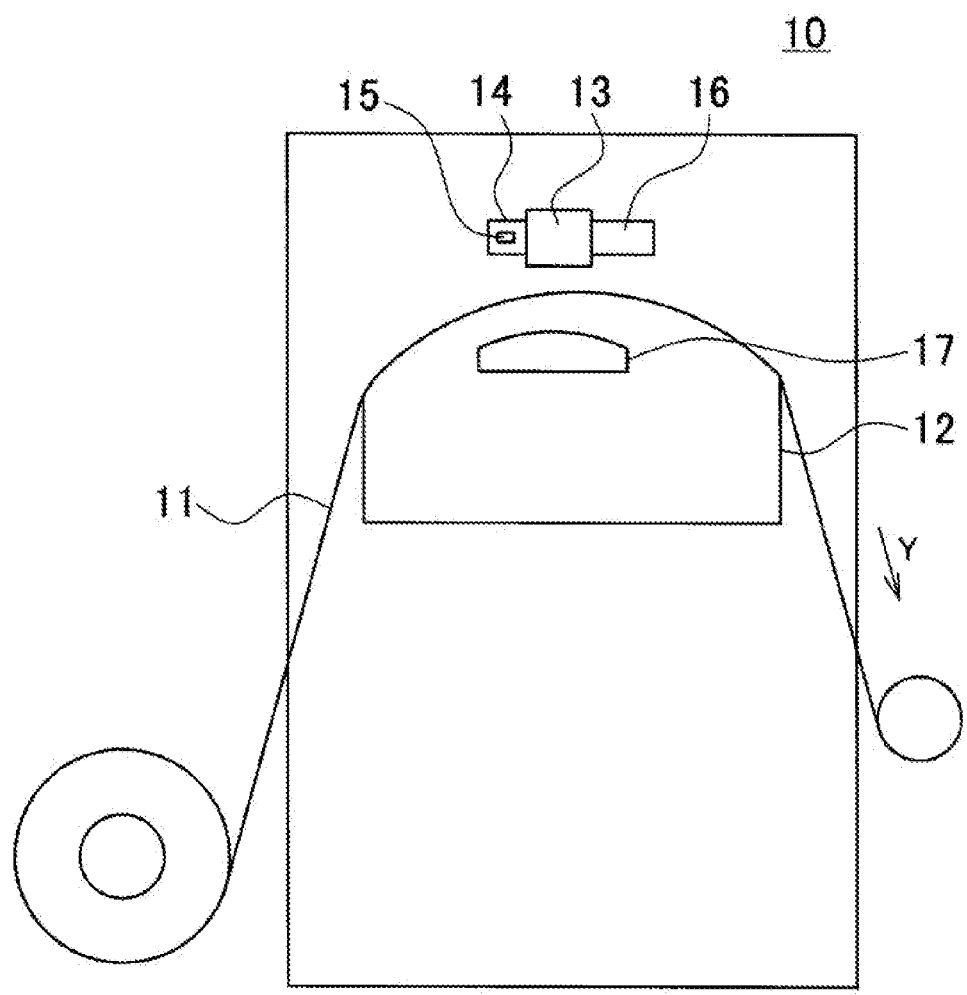

INK, INKJET PRINTER, AND METHOD FOR PRINTING

CROSS-REFERENCE TO RELATED APPLICATIONS

The present application is a continuation application of International Application No. PCT/JP2010/002863, filed Apr. 21, 2010, which claims priority to Japanese Patent Application No. 2009-135558, filed Jun. 4, 2009. The contents of these applications are incorporated herein by reference in their entirety.

BACKGROUND OF THE INVENTION

1. Field of the Invention

The present invention relates to an ink, an inkjet printer, and a method for printing.

2. Discussion of the Background

Solvent inks and UV (ultraviolet) curable inks are examples of inks that are typically used in inkjet printers. The solvent ink is primarily an ink in which a pigment and a binder resin are dispersed in a volatile solvent. The ink is sprayed from an inkjet head on the surface of a medium (printing medium), and then the volatile solvent in the ink is volatilized by using a heater that is arranged beneath the printing medium. Consequently, the ink is fixed on the surface of the printing medium leading to printing of an image.

On the other hand, the UV (ultraviolet) curable ink contains a pigment, an ultraviolet curable resin (monomer or/and oligomer), polymerization initiator, etc. The UV ink is sprayed from the inkjet head on the printing medium, and then an ultraviolet light is irradiated by using an ultraviolet irradiation unit to cure the resin. Consequently, the ink is fixed on the surface of the printing medium leading to printing of an image.

The solvent ink is advantages in that, because the viscosity of the ink is low the ink spreads thinly on the surface of the medium and the surface of the ink is also flat, high-quality glossiness is obtained in the printed image. However, there are disadvantages that because the volatile organic solvent content is higher than 80 wt % (percent by weight), the ink runs the moment it is deposited on the printing medium, and therefore, a fine image cannot be produced. Furthermore, it is necessary to use vinyl chloride, rubber, or a special paper as a printing medium so that the choice of the material of the printing medium is limited.

The applicant has disclosed a technique for preventing running of the ink in International Publication No. 2004/094150. The inkjet printer disclosed in International Publication No. 2004/094150 includes a pre-heater that preheats a supporting body, and a heater that quickly heats the ink deposited on a platen (recording medium) arranged on the supporting body.

SUMMARY OF THE INVENTION

According to one aspect of the present invention, an ink comprises a viscosity greater than or equal to 3 mPa·sec and less than or equal to 18 mPa·sec (at 25° C.), a volatile organic solvent, and a UV curable ink. The UV curable ink has a viscosity of greater than or equal to 20 mPa·sec (at 25° C.) The UV curable ink comprises a pigment, an ultraviolet curable resin curable by an ultraviolet light, and a photopolymerization initiator.

According to another aspect of the present invention, an inkjet printer comprises a supporting body, an inkjet head, a heater, and a UV irradiation device. The supporting body is to support a printing medium. The inkjet head is to spray the ink according to claim 1 from a plurality of discharge ports to a surface of the printing medium to deposit ink droplets on the surface of the printing medium. The heater is arranged on at least one of a back side and a front side of the printing medium and is provided to apply heat to the ink droplets deposited on the surface of the printing medium to remove the volatile organic solvent present in the ink droplets by volatilization. The UV irradiation device is to irradiate the ink droplets on the surface of the printing medium from which the volatile organic solvent has been removed by volatilization with a UV light to cure the ink droplets.

According to further aspect of the present invention, a method for printing an image comprising an array of a plurality of ink droplets on a surface of a printing medium comprises: spraying the ink according to claim 1 from a plurality of discharge ports of an inkjet head to deposit the ink droplets on the surface of the printing medium; applying heat to the ink droplets deposited on the surface of the printing medium with a heater arranged on at least one of a back side and a front side of the printing medium to remove the volatile organic solvent present in the ink by volatilization; and irradiating the ink droplets with an ultraviolet light using a UV irradiation device to cure and fix the ink droplets on the surface of the printing medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a schematic top view of relevant parts of an inkjet printer according to an embodiment of the present invention.

FIG. 2 is a schematic side view of the inkjet printer according to the embodiment of the present invention.

DESCRIPTION OF THE EMBODIMENTS

The embodiments will now be described with reference to the accompanying drawings, wherein like reference numerals designate corresponding or identical elements throughout the various drawings.

Exemplary embodiments of an ink, an inkjet printer, and a method for printing according to the present invention are explained in detail below with reference to the accompanying drawings.

Embodiments of the ink according to the present invention are explained first.

(Ink)

An ink according to an embodiment has a viscosity of 10 mPa·sec at 25° C. and it is prepared by adding n-hexane of 60 wt % to 85 wt % having a viscosity of 0.32 (at 20° C.) and a boiling point of 69° C. to a UV curable ink that contains monomer (55 wt % to 88 wt %) and oligomer (0 wt % to 15 wt %), a photopolymerization initiator (6 wt % to 13 wt %), a sensitizer (3 wt % to 30 wt %), a coloring matter (pigment) (3 wt % to 6 wt %), and an additive (1 wt % to 8 wt %; a dispersant, a leveling agent, and a polymerization inhibitor), and that has a high viscosity of 30 mPa·sec to 300 mPa·sec (at 25° C.)

For example, the ink having a viscosity of 8 mPa·sec can be prepared by adding n-hexane to the UV curable ink having a viscosity of approximately 30 mPa·sec (at 25° C.) such that a content of n-hexane in the whole ink is 75 wt %.

The monomer and oligomer are ultraviolet curable resins that are cured by an ultraviolet light.

The ink is formed by using the UV curable ink that contains monomer and/or oligomer, the photopolymerization initiator, the sensitizer, the coloring matter, and the additive, and that has a viscosity greater than or equal to 20 mPa·sec (at 25° C., which is the room temperature). The viscosity of the ink is adjusted to greater than or equal to 3 mPa·sec and less than or equal to 18 mPa·sec by suitably adjusting a content of the volatile organic solvent. It is preferable that the viscosity of the UV curable ink be greater than or equal to 20 mPa·sec (at 25° C.). However, it is more preferable that the viscosity of the UV curable ink be 50 mPa·sec (at 25° C.). If the viscosity is less than 20 mPa·sec (at 25° C., the ink runs heavily and quickly. If the viscosity is greater than or equal to 20 mPa·sec (at 25° C.) and less than 50 mPa·sec (at 25° C.), the ink still runs; however, the running of the ink is slower, and therefore, the fineness of the image is not affected in the time it takes for the ink to be irradiated with the ultraviolet light and cured. Furthermore, a high-definition image can be obtained by controlling the duration of irradiation with the ultraviolet light. If the viscosity is 50 mPa·sec (at 25° C.), the running of the ink is not noticeable. If the viscosity is 100 mPa·sec (at 25° C.), the running of the ink is almost absent and if the viscosity is 1000 mPa·sec (at 25° C.), the running of the ink is totally absent.

It is preferable that the content of the volatile organic solvent be greater than or equal to 30 wt % and less than or equal to 90 wt %. Furthermore, it is more preferable that the content of the volatile organic solvent be greater than or equal to 50 wt % and less than or equal to 70 wt %.

Volatile organic solvents other than n-hexane can be used. A volatile organic solvent, which has a contact angle smaller than that of the UV curable ink, a viscosity of less than or equal to 5 mPa·sec, more preferably, less than or equal to 2 mPa·sec, and a boiling point of less than or equal to 200° C., more preferably, less than or equal to 160° C., can be suitably selected. Some of the examples are isoparaffin hydrocarbons (Idemitsu Kosan Co., Ltd: IP solvent 1016, IP solvent 1620, etc.), ketone, such as, cyclohexanone, aromatic hydrocarbons, such as, toluene and xylene, and esters, such as, dipropylene glycol and mono-methyl ether acetate. Furthermore, the volatile organic solvent need not be limited to one type, i.e., a combination of a plurality of the volatile organic solvents can be used.

The pigment, monomer and/or oligomer, and photopolymerization initiator are not particularly limited. Known pigments, monomers and/or oligomers, and photopolymerization initiators can be suitably selected and used. Furthermore, common sensitizers, and various additives, such as, dispersants, leveling agents, and polymerization inhibitors can be suitably selected and used.

The ink contains the volatile organic solvent, and therefore, the viscosity of the ink at the room temperature can be reduced. The volatile organic solvent can be quickly removed by volatilization before UV curing is performed. Therefore, an image with a high gloss and a high-quality having enhanced flatness of the surface of the ink droplets can be printed.

Embodiments of the inkjet printer and the method for printing according to the present invention are explained below. FIG. 1 is a schematic top view of relevant parts of an inkjet printer according to an embodiment of the present invention, and FIG. 2 is a schematic side view of the inkjet printer.

(Inkjet Printer)

An inkjet printer 10 according to an embodiment includes a platen (supporting body) 12 that supports a medium (recording medium) 11; an inkjet head 13 that sprays ink from a plurality of discharge ports and causes ink droplets to be deposited on a surface of the recording medium 11 while moving in an X direction (in a horizontal direction of a sheet surface); a print heater (heating unit) 17 that is positioned on the back side of the recording medium 11, that applies heat to the ink droplets deposited on the surface of the recording medium 11, and removes by volatilization the volatile organic solvent present in the ink droplets; and a UV irradiation unit 16 that is arranged frontward in a moving direction (Y direction) of the recording medium 11, that irradiates the ultraviolet light on the ink droplets on the surface of the recording medium 11 from which the volatile organic solvent is removed by volatilization, and cures the ink droplets.

The inkjet head 13 sprays the ink droplets from not shown nozzles that are arranged in a line at the bottom thereof using a piezo method, etc. The inkjet head 13 is fixed to a unit mount 14, and is movable over a guide rail 15 in the X direction by action of a not shown moving unit. The moving unit includes an electric motor, an electronic circuit for controlling the electric motor, etc.

The ink explained above is used in the inkjet printer 10. That is, the ink having a viscosity of greater than or equal to 3 mPa·sec and less than or equal to 18 mPa·sec, and prepared by adding the volatile organic solvent to the UV curable ink that contains the pigment, the ultraviolet curable resin curable by the ultraviolet light, and the photopolymerization initiator, and that has a viscosity of 20 mPa·sec (at 25° C.) is used in the inkjet printer 10.

The recording medium 11 is supported by the platen 12, and sandwiched between not shown pinch rollers and not shown feed rollers. As the inkjet head 13 finishes scanning of the recording medium 11 from one end to the other end in the X direction while spraying the ink, the recording medium 11 is conveyed in the Y direction by rotation of the rollers. The recording medium 11 can be of almost any material, for example, plastic, such as, PET, PP, PC, and acrylic, metal, glass, vinyl chloride, rubber, or a special paper meant for a solvent ink.

The print heater (heating unit) 17 is arranged inside the platen and on the back side of the recording medium 11. The print heater 17 applies heat to the ink droplets deposited on the surface of the recording medium 11 and removes by volatilization the volatile organic solvent present in the ink droplets. An electrothermal heater, an infrared heater, or an electromagnetic induction heater (IH) can be used as the print heater 17.

The platen is maintained at a constant temperature so that the volatile organic solvent present in the ink is removed by volatilization as the ink is sprayed and deposited on the surface of the recording medium. It is preferable to set a lower limit of a heating temperature of the print heater to a temperature at which the volatile organic solvent is sufficiently removed by volatilization before the recording medium 11 is transferred to a position of the UV irradiation unit. For example, the lower limit of the heating temperature of the print heater is approximately 35° C. It is preferable to determine an upper limit of the temperature from the perspective of safety towards the human body based on an upper temperature limit of the recording medium and increasing temperature of the heater. For example, the upper limit is approximately 80° C.

The heating unit need not necessarily be arranged on the back side of the recording medium. The heating unit can be positioned on the front side or on both front and back sides of the recording medium. When the heating unit is to be arranged on the front side of the recording medium, it can be positioned over the guide rail 15 similarly as the inkjet head. Alternatively, the heating unit can be fixedly set up frontward in the Y direction (in a platen conveying direction) in a state of being separated from the guide rail 15. In an alternative structure, when the heating unit is to be arranged over the guide rail similarly as the inkjet head and unidirectional printing is to be performed, the heating unit needs to be arranged backward in the moving direction of the inkjet head. In greater detail, the heating unit is arranged on the left side of the sheet surface of the inkjet head when the inkjet head discharges the ink while moving on the right side in the X direction. Furthermore, the heating unit is arranged on the right side of the sheet surface of the inkjet head when the inkjet head discharges the ink while moving on the left side in the X direction. When bidirectional printing is to be performed, the heating unit is arranged frontward and backward in a moving direction of the inkjet head, that is, on the right and left sides of the sheet surface of the inkjet head.

The UV irradiation unit 16 has an inbuilt UVLED (Ultra Violet Light Emitting Diode). The UV irradiation unit 16 is arranged on the unit mount 14 along with the inkjet head 13, and frontward in the moving direction (Y direction) of the recording medium 11 relative to the inkjet head 13, and is movable in the X direction by the action of the not shown moving unit. When a conveyance roller conveys the recording medium 11 after the ink droplets are deposited thereon from the inkjet head 13, the UV irradiation unit 16 irradiates the surface of the recording medium 11 with the ultraviolet light to cure and fix the ink droplets thereon.

A UVLED lamp can be most suitably used as the UV irradiation unit 16, although not particularly limited thereto. The UVLED lamp is advantageous in that an amount of irradiation light can be freely adjusted by changing an electric current or a light emission pulse width and ON/OFF control is enabled; therefore, less power is consumed. However, other lamps, such as, metal halide lamp, xenon lamp, and high-pressure mercury can be used as an amount of the ultraviolet light emitted from these lamps can be varied by providing a shutter mechanism.

As described above, in the inkjet printer 10 according to the embodiment of the present invention, the inkjet head 13 sprays the ink according to the embodiment of the present invention on the surface of the recording medium 11 that is supported on the platen (supporting body) 12, the print heater, which is arranged on the back side of the recording medium, removes by volatilization the volatile organic solvent present in the ink droplets, thereafter, the UV irradiation unit 16 irradiates the ultraviolet light to cure the UV ink droplets and fixes them on the surface of the recording medium 11, and as a result, an image that is formed of an array of the UV ink droplets is printed on the surface of the recording medium 11. According to the inkjet printer of the present embodiment, because the surfaces of the ink droplets formed on the recording medium 11 are flat, a glossy image can be obtained, and because the ink according to the embodiment of the present invention is used, no running of the ink droplets occurs and a high-definition image can be obtained.

In the inkjet printer according to the embodiment, as an example, a case is explained in which the inkjet head 13 and the UV irradiation unit 16 are fixed together onto the unit mount. However, the present invention is not to be thus limited. The UV irradiation unit can be separated from the inkjet head and fixed onto a separate guide rail that is positioned frontward in the Y direction so as to be movable in the X direction. Alternatively, by positioning the UV irradiation unit frontward in the Y direction, the UV lamp can be fixedly set up across the entire width of the platen in the X direction. A black light, or a discharge tube, such as, a sterilization lamp can be used as the UV lamp.

(Method for Printing)

An embodiment of a method for printing in which the ink and the inkjet printer 10 according to the above embodiments are used is explained below with reference to FIGS. 1 and 2.

In the method for printing according to the present embodiment, printing is performed using the ink and the inkjet printer according to the above embodiments. The ink is sprayed from the discharge ports of the inkjet head 13 and the ink droplets are deposited on the surface of the recording medium 11. The deposited ink droplets are then heated by the heating unit, which is positioned on the back side of the recording medium, to remove the volatile organic solvent present in the ink droplets by volatilization. Thereafter, the ink droplets are irradiated with the ultraviolet light by the UV irradiation unit 16 and cured and fixed on the surface of the recording medium 11. Consequently, the image formed of an array of the ink droplets is printed on the surface of the recording medium 11.

The ink according to the above embodiments having a viscosity of approximately 4 mPa·sec is filled in an inkjet head unit and the ink droplets are sprayed on the recording medium while the inkjet head moves in the X direction. In this case, because there is no risk of the ink clogging the inkjet head, there is no need to specifically arrange a heating unit, such as, a heater, in the inkjet head. Meanwhile, the viscosity of the ink when discharged can be reduced by heating the inkjet head or the ink with hot water.

The ink droplets sprayed on the recording medium 11 are immediately heated by the print heater that is positioned on the back side of the recording medium, and that maintains the surface of the recording medium at 40° C. to 80° C., and removes the volatile organic solvent by vaporization. Consequently, because the ink droplets of the UV curable ink having a high viscosity of 30 mPa·sec are formed, running of the ink droplets is prevented.

The recording medium 11 is conveyed in the Y direction by the platen 12. The ink droplets on the surface of the recording medium from which the volatile organic solvent is removed by volatilization are irradiated with the ultraviolet light by the UV irradiation unit 16, which is arranged frontward in the Y direction of the recording medium, and cured and fixed on the recording medium 11. Consequently, an image formed of an array of the ink droplets is printed on the surface of the recording medium 11.

The ink, the inkjet printer, and the method for printing according to the embodiment of the present invention are explained so far. However, the present invention is not limited to these examples. Various modifications may be made without departing from the spirit or scope of the general inventive concept as defined by the accompanying claims and their equivalents.

An ink according to the embodiment of the present invention has a viscosity greater than or equal to 3 mPa·sec and less than or equal to 18 mPa·sec (at 25° C., which is the room temperature), and prepared by adding a volatile organic solvent to a UV curable ink that includes at least a pigment, an ultraviolet curable resin curable by an ultraviolet light, and a photopolymerization initiator, and has a viscosity of greater than or equal to 20 mPa·sec (at 25° C.)

Because a viscosity of an ink according to the embodiment of the present invention is greater than or equal to 3 mPa·sec and less than or equal to 18 mPa·sec, when used in an inkjet printer the ink is sprayed smoothly from an inkjet head without any clogging of the inkjet head. Furthermore, gentle unevenness of a surface of a plurality of ink droplets deposited on a printing medium is flattened due to removal of a volatile organic solvent by volatilization, and a high-quality image with a high gloss can be obtained by curing and fixing the ink with an ultraviolet light. Furthermore, because an ultraviolet curable resin of high viscosity of greater than or equal to 20 mPa·sec is used, running of the ink is prevented by removing the volatile organic solvent by volatilization with a heating unit, and a high-definition image can be obtained. Moreover, because a thickness of the ink droplets that are deposited is large, there is an advantage that the ink droplets exhibit an excellent ultraviolet sensitivity.

A solvent ink, which is similar to the ink according to the embodiment of the present invention in a viscosity thereof and presence of an organic solvent, can be used for only printing on printing mediums, such as, vinyl chloride, rubber, and special papers meant for the solvent ink. However, the ink according to the embodiment of the present invention can be used for printing on a wide range of printing mediums, namely plastics, such as, PET, PP, PC, acryl, metal, glass, etc.

In the ink according to the embodiment of the present invention, a content of the volatile organic solvent is greater than or equal to 30 wt % and less than or equal to 90 wt %.

An inkjet printer according to the embodiment of the present invention includes a supporting body that supports a printing medium; an inkjet head that sprays from a plurality of discharge ports an ink according to the embodiment causing ink droplets to be deposited on a surface of the printing medium; a heating unit that is arranged on at least one of a back side and a front side of the printing medium, and that applies heat to the ink droplets deposited on the surface of the printing medium to remove the volatile organic solvent present in the ink droplets by volatilization; and a UV irradiation unit that irradiates the ink droplets on the surface of the printing medium from which the volatile organic solvent has been removed by volatilization with a UV light to cure the ink droplets.

In the inkjet printer according to the embodiment of the present invention, the heating unit is arranged on at least one of a back side and a front side of the printing medium. Consequently, the volatile organic solvent present in the ink droplets of the ink according to the embodiment of the present invention mentioned above is removed by volatilization immediately upon their deposition on the printing medium, and thereby the ink can be prevented from running. Furthermore, the surface of the ink droplets can be flattened by removing the unevenness. The flattened ink droplets are cured and fixed by a UV irradiation unit to obtain a glossy, high-definition image.

A method for printing an image according to the embodiment comprises an array of a plurality of ink droplets on a surface of a printing medium includes spraying an ink according to the embodiment from a plurality of discharge ports of an inkjet head and causing the ink droplets to be deposited on the surface of the printing medium; applying heat to the ink droplets deposited on the surface of the printing medium with a heating unit arranged on at least one of a back side and a front side of the printing medium to remove the volatile organic solvent present in the ink by volatilization; and irradiating the ink droplets with an ultraviolet light by a UV irradiation unit to cure and fix the ink droplets on the surface of the printing medium.

In the method for printing according to the embodiment of the present invention, the volatile organic solvent present in the ink droplets is removed by volatilization by applying heat to the ink droplets with the heating unit. Thereafter, the ink droplets are irradiated with the ultraviolet light by the UV irradiation unit to cure and fix them on a surface of the printing medium. Consequently, the surfaces of the ink droplets can be flattened, and a glossy, high-definition image can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. An inkjet printer comprising:
   a supporting body to support a printing medium;
   an inkjet head to discharge an ink from a plurality of discharge ports to a surface of the printing medium to deposit ink droplets on the surface of the printing medium, the ink comprising:
      a viscosity greater than or equal to 3 mPa·sec and less than or equal to 18 mPa·sec (at 25° C.);
      a volatile organic solvent; and
      a UV curable ink having a viscosity of greater than or equal to 20 mPa·sec (at 25° C.), the UV curable ink comprising:
         a pigment;
         an ultraviolet curable resin curable by an ultraviolet light; and
         a photopolymerization initiator;
   a heater arranged on at least one of a back side and a front side of the printing medium and provided to apply heat to the ink droplets deposited on the surface of the printing medium to remove the volatile organic solvent present in the ink droplets by volatilization; and
   a UV irradiation device to irradiate the ink droplets on the surface of the printing medium from which the volatile organic solvent has been removed by volatilization with a UV light to cure the ink droplets, the UV irradiation device being provided to irradiate, after the heater has removed the volatile organic solvent by volatilization from the printing medium to prevent the ink droplets from running on the surface of the printing medium, the ink droplets on the printing medium with the UV light to cure the ink droplets flattened due to removal of the volatile organic solvent by volatilization.

2. The inkjet printer according to claim 1, wherein a content of the volatile organic solvent is greater than or equal to 30 wt % and less than or equal to 90 wt %.

3. The inkjet printer according to claim 1, wherein the volatile organic solvent is n-hexane.

4. The inkjet printer according to claim 1, wherein the ink does not contain water as a solvent.

5. The inkjet printer according to claim 1, wherein the UV irradiation device is provided on a downstream side with respect to the heater in a direction in which the printing medium is to be conveyed on the supporting body.

6. The inkjet printer according to claim 1, wherein the heater is arranged below the UV irradiation device.

7. The inkjet printer according to claim 1,
   wherein the UV irradiation device is provided on a downstream side with respect to the heater in a direction in which the printing medium is to be conveyed on the supporting body, and
   wherein the heater is arranged on the back side opposite to the inkjet head with respect to the printing medium and is arranged below the UV irradiation device and the inkjet head.

8. The inkjet printer according to claim 7, wherein the heater is arranged under the inkjet head.

9. The inkjet printer according to claim 1, wherein the heater is arranged on the back side opposite to the inkjet head with respect to the printing medium and is arranged below the UV irradiation device and the inkjet head.

10. The inkjet printer according to claim 9, wherein the heater is arranged under the inkjet head.

11. A method for printing an image comprising an array of a plurality of ink droplets on a surface of a printing medium, the method comprising:
- discharging an ink from a plurality of discharge ports of an inkjet head to deposit the ink droplets on the surface of the printing medium, the ink comprising:
  - a viscosity greater than or equal to 3 mPa·sec and less than or equal to 18 mPa·sec (at 25° C.);
  - a volatile organic solvent; and
  - a UV curable ink having a viscosity of greater than or equal to 20 mPa·sec (at 25° C.), the UV curable ink comprising:
    - a pigment;
    - an ultraviolet curable resin curable by an ultraviolet light; and
    - a photopolymerization initiator;
- applying heat to the ink droplets deposited on the surface of the printing medium with a heater arranged on at least one of a back side and a front side of the printing medium to remove the volatile organic solvent present in the ink by volatilization; and
- irradiating, after the volatile organic solvent has been removed by volatilization with the heater from the printing medium to prevent the ink droplets from running on the surface of the printing medium, the ink droplets with an ultraviolet light using a UV irradiation device to cure and fix the ink droplets flattened due to removal of the volatile organic solvent by volatilization on the surface of the printing medium.

12. The method according to claim 11, wherein a content of the volatile organic solvent is greater than or equal to 30 wt % and less than or equal to 90 wt %.

13. The method according to claim 11, wherein the volatile organic solvent is n-hexane.

14. The method according to claim 11, wherein the ink does not contain water as a solvent.

15. The method according to claim 11, wherein the applying of heat includes applying heat to the ink droplets deposited on the surface of the printing medium with the heater arranged below the UV irradiation device to remove the volatile organic solvent present in the ink by volatilization.

16. The method according to claim 15, wherein the heater is arranged under the inkjet head.

17. The method according to claim 11, wherein the applying of heat includes applying heat, from the back side opposite to the inkjet head with respect to the printing medium, to the ink droplets deposited on the surface of the printing medium with the heater arranged below the UV irradiation device and the inkjet head to remove the volatile organic solvent present in the ink by volatilization.

18. The method according to claim 17, wherein the heater is arranged under the inkjet head.

\* \* \* \* \*